United States Patent
Szczerba et al.

(10) Patent No.: US 12,437,672 B2
(45) Date of Patent: Oct. 7, 2025

(54) SYSTEMS AND METHODS FOR COMMUNICATING WITH VISION-IMPAIRED VEHICLE OCCUPANTS

(71) Applicant: GM Global Technology Operations LLC, Detroit, MI (US)

(72) Inventors: Joseph F. Szczerba, Grand Blanc, MI (US); Ki Hyun Ahn, Lake Orion, MI (US); Jacob Alan Bond, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 748 days.

(21) Appl. No.: 17/814,130

(22) Filed: Jul. 21, 2022

(65) Prior Publication Data

US 2024/0029584 A1 Jan. 25, 2024

(51) Int. Cl.
 *B60K 31/18* (2006.01)
 *B60Q 9/00* (2006.01)
 (Continued)

(52) U.S. Cl.
 CPC .............. *G09B 21/006* (2013.01); *B60Q 9/00* (2013.01); *G06F 3/167* (2013.01); *G06F 40/58* (2020.01);
 (Continued)

(58) Field of Classification Search
 CPC ........ G09B 21/006; B60Q 9/00; B60Q 3/735; B60Q 1/00; B60Q 2300/23; B60Q 2400/50; B60Q 3/74; B60Q 3/76; B60Q 3/80; B60Q 1/143; B60Q 2500/30; B60Q 1/1415; B60Q 1/247; B60Q 1/323; B60Q 1/48;
 (Continued)

(56) References Cited

U.S. PATENT DOCUMENTS 5,801,823 A * 9/1998 Brandin .................... B60R 1/02
 250/559.3
10,200,786 B1 * 2/2019 Friedrich ................. H04R 3/00
 (Continued)

OTHER PUBLICATIONS

United States Patent and Trademark Office. Pending U.S. Appl. No. 17/410,189, filed Aug. 24, 2021, pp. 1-39.
(Continued)

*Primary Examiner* — Daniel Previl
(74) *Attorney, Agent, or Firm* — Vivacqua Crane, PLLC

(57) ABSTRACT

An occupant output system includes at least one output device adapted to provide output directed to a single passenger, an occupant monitoring system to track location and movement of the passenger within the vehicle, at least one processor configured to execute program instructions, wherein the program instructions are configured to cause the at least one processor to receive data from the occupant monitoring system, analyze the data from the occupant monitoring system to determine if the passenger is vision-impaired, analyze the data from the occupant monitoring system to determine a location of the passenger within the vehicle and an orientation of a head of the passenger, and, when the passenger is determined to be vision impaired, generate an output for the passenger on the at least one output device, based on the location of the passenger within the vehicle and the orientation of the head of the passenger.

20 Claims, 6 Drawing Sheets

(51) Int. Cl.
  *G06F 3/16*      (2006.01)
  *G06F 40/58*     (2020.01)
  *G06V 20/59*     (2022.01)
  *G09B 21/00*     (2006.01)
  *G10L 15/22*     (2006.01)
  *H04R 1/02*      (2006.01)
  *H04R 1/32*      (2006.01)

(52) U.S. Cl.
  CPC .............. *G06V 20/59* (2022.01); *G10L 15/22* (2013.01); *H04R 1/025* (2013.01); *H04R 1/323* (2013.01); *H04R 2499/13* (2013.01)

(58) Field of Classification Search
  CPC .......... B60Q 2300/054; B60Q 2300/30; B60Q 2300/40; B60Q 3/16; B60Q 3/85; B60Q 1/04; B60Q 1/20; B60Q 1/46; B60Q 2300/05; B60Q 2300/122; B60Q 2300/20; B60Q 2300/42; B60Q 3/10; B60Q 3/208; B60Q 3/233; B60Q 3/57; B60Q 3/731; B60Q 3/745; B60Q 9/008; G06F 3/167; G06F 40/58; G06F 3/013; G06F 3/012; G06F 18/22; G06F 16/51; G06F 18/24; G06F 18/2413; G06F 3/011; G06F 3/017; G06F 18/28; G06F 3/14; G06F 16/3344; G06F 16/355; G06F 18/214; G06F 18/251; G06F 3/0304; G06F 21/32; G06F 2203/0381; G06F 3/038; G06F 3/0421; G06F 3/04815; G06F 3/1423; G06F 1/1694; G06F 16/2237; G06F 16/2264; G06F 18/2148; G06F 18/23; G06F 18/24133; G06F 18/2415; G06F 2218/02; G06F 3/01; G06F 3/016; G06F 3/041; G06F 3/04842; G06F 3/147; G06F 16/2438; G06F 16/248; G06F 16/254; G06F 16/258; G06F 16/29; G06F 2203/04803; G06F 2203/04806; G06F 3/0325; G06F 3/04817; G06F 3/0482; G06F 3/04845; G06F 3/0487; G06F 3/0488; G06F 3/04883; G06F 3/165; G06F 40/56; G06F 9/451; G06V 20/59; G06V 20/597; G06V 20/593; G06V 10/82; G06V 40/10; G06V 20/58; G06V 40/18; G06V 40/172; G06V 20/64; G06V 40/11; G06V 40/20; G06V 40/103; G06V 20/56; G06V 20/588; G06V 10/764; G06V 40/161; G06V 40/107; G06V 10/454; G06V 20/584; G06V 40/166; G06V 40/28; G06V 10/95; G06V 2201/07; G06V 40/165; G06V 10/25; G06V 10/803; G06V 20/46; G06V 20/52; G06V 20/586; G06V 40/168; G06V 40/171; G06V 10/143; G06V 20/20; G06V 2201/08; G06V 40/176; G06V 40/19; G06V 10/56; G06V 10/60; G06V 20/582; G06V 2201/10; G06V 40/12; G06V 40/178; G06V 40/193; G06V 10/141; G06V 10/40; G06V 10/50; G06V 10/751; G06V 10/80; G06V 20/41; G06V 20/625; G06V 40/23; G06V 10/1447; G06V 10/22; G06V 10/255; G06V 10/26; G06V 10/44; G06V 10/761; G06V 10/774; G06V 20/00; G06V 20/54; G06V 40/113; G06V 40/16; H04R 1/025; H04R 1/323; H04R 2499/13; H04R 1/406; H04R 2201/401; H04R 3/005; H04R 1/403; H04R 2203/12; H04R 5/02; G10L 15/22; G10L 15/1822; G10L 2015/088; G10L 2015/227; B60W 40/08; B60W 50/14; B60W 2420/403; B60W 2540/22; B60W 2540/223; B60W 2040/0872; B60W 2540/225; B60W 2050/146; B60W 2540/229; B60W 40/09; B60W 60/0053; B60W 2050/143; B60W 2540/26; B60W 60/0059; B60W 2040/0818; B60W 50/08; B60W 2050/0095; B60W 2420/54; B60W 2540/221; B60W 2540/30; B60W 2540/043; B60W 2554/00; B60W 2556/45; B60W 2540/227; B60W 2556/65; B60W 2555/20; B60W 50/16; B60W 2050/0075; B60W 2720/106; B60W 30/08; B60W 40/10; B60W 50/0097; B60W 50/0098; B60W 2520/16; B60W 2552/00; B60W 2552/35; B60W 30/09; B60W 10/18; B60W 2520/105; B60W 2710/18; B60W 2710/30; B60W 30/06; B60W 30/0956; B60W 40/02; B60W 50/082; B60W 50/12; B60W 60/001; B60W 2420/50; B60W 2422/00; B60W 2520/18; B60W 2540/01; B60W 2540/18; B60W 2555/60; B60W 2556/50; B60W 30/025; B60W 30/16; B60W 30/182; B60W 40/076; B60W 40/105; B60W 60/0013; B60W 10/10; B60W 10/30; B60W 2040/0809; B60W 2040/0827; B60W 2040/0881; B60W 2050/0022; B60W 2050/0026; B60W 2050/0088; B60W 2050/0215; B60W 2050/046; B60W 2420/408; B60W 2520/10; B60W 2520/125; B60W 2520/14; B60W 2540/049; B60W 2540/12; B60W 2552/05; B60W 2554/801; B60W 2554/802; B60W 2556/10; B60W 2556/20; B60W 2710/10; B60W 2710/20; B60W 2756/10; B60W 2900/00; B60W 30/12; B60W 30/143; B60W 30/18; B60W 30/18027; B60W 40/06; B60W 40/072; B60W 40/107; B60W 50/0205; B60W 50/045; B60W 50/06; B60W 60/00133; B60W 60/0015; B60W 60/0017; B60W 60/0054; B60W 60/0057; B60W 60/007; B60W 10/06; B60W 2420/40; B60W 2422/90; B60W 2540/10; B60W 2554/4044; B60W 2554/80; B60W 2710/0605; B60W 2710/202; B60W 30/146; B60W 60/0016; B60W 60/0025; G06T 2207/30268; G06T 7/70; G06T 7/73; G06T 2207/30196; G06T 2207/20084; G06T 2207/20081; G06T 15/005; G06T 2207/10016; G06T 2207/30201; G06T 7/337; G06T 19/006; G06T 2207/30252; G06T 11/00; G06T 2207/10012; G06T 2207/10024; G06T 7/593; G06T 7/74; G06T 2207/10044; G06T 2207/10028; G06T 2207/20076; G06T 2207/10021; G06T 2207/10048; G06T 2207/20132; G06T 2210/22; G06T 7/11; G06T 7/20; G06T 7/246; G06T 7/90; G06T 11/001; G06T 3/4038; G06T 7/248; G06T 7/50; G06T 7/80; G06T 1/20; G06T 2207/20104; G06T 2207/20212; G06T 2207/30192; G06T
2207/30248; G06T 2207/30256; G06T
2207/30261; G06T 3/40; G06T 5/70;
G06T 7/0002; G06T 7/97; G06T 1/00;
G06T 19/20; G06T 2207/10052; G06T
2207/20221; G06T 2207/30204; G06T
2207/30242; G06T 2207/30264; G06T
2219/024; G06T 2219/2004; G06T
2219/2016; G06T 3/047; G06T 3/18;
G06T 7/292; G06T 7/55; G06T 7/557;
G06T 7/60; B60K 35/28; B60K 35/10;
B60K 2360/21; B60K 35/81; B60K
35/22; B60K 2360/177; B60K 35/29;
B60K 2360/334; B60K 35/235; B60K
2360/166; B60K 35/23; B60K 35/60;
B60K 35/654; B60K 2360/149; B60K
2360/178; B60K 2360/167; B60K 35/80;
B60K 35/285; B60K 2360/168; B60K
2360/176; B60K 2360/31; B60K 2360/48;
B60K 28/06; B60K 35/00; B60K 35/233;
B60K 35/65; B60K 2360/179; B60K
2360/182; B60K 35/213; B60K 2360/164;
B60K 2360/186; B60K 2360/188; B60K
2360/29; B60K 2360/741; B60K 2360/77;
B60K 28/066; B60K 35/234; B60K
35/26; B60K 35/50; B60K 37/00; B60K
2360/146; B60K 2360/349; B60K
2360/771; B60K 28/02; B60K 35/211;
B60K 2360/141; B60K 2360/1526; B60K
2360/175; B60K 2360/195; B60K
2360/347; B60K 2360/66; B60K
2360/785; B60K 35/223; B60K 35/231;
B60K 35/53; B60K 35/656; B60K
35/658; B60K 2360/11; B60K 2360/1438;
B60K 2360/1464; B60K 2360/191; B60K
2360/197; B60K 2360/777; B60K 35/21;
G02B 35/21; G02B 2027/0138; G02B
2027/0187; G02B 27/01; G02B 2027/014;
G02B 27/0101; G02B 2027/0141; G02B
27/0093; G02B 27/0179; G02B 27/017;
G02B 2027/0181; G02B 27/0172; G02B
27/0149; G02B 2027/0123; G02B
2027/0159; G02B 2207/113; G02B
13/0065; G02B 17/006; G02B 17/0631;
G02B 19/0076; G02B 2003/0093; G02B
27/0025; G02B 30/56; G02B 7/182;
G02B 2027/011; G02B 2027/013; G02B
2027/0154; G02B 2027/0163; G02B
2027/0183; G02B 2027/0185; G02B
2027/0196; G02B 27/0103; G02B
27/0189; G02B 27/64; G02B 27/0006;
G02B 27/14; G02B 30/31; G02B 7/1821;
B60R 11/04; B60R 21/01552; B60R
2300/105; B60R 2300/80006; B60R
21/01542; B60R 2001/1253; B60R
21/0134; B60R 1/12; B60R 21/01538;
B60R 2300/30; B60R 1/04; B60R 16/037;
B60R 2021/01013; B60R 2021/343;
B60R 2021/346; B60R 21/36; B60R
2021/0004; B60R 2021/01034; B60R
21/02; B60R 1/23; B60R 1/26; B60R
2011/0033; B60R 2021/0006; B60R
2021/0034; B60R 2021/0048; B60R
2021/01252; B60R 2021/0273; B60R
21/017; B60R 21/04; B60R 21/055; B60R
21/06; B60R 1/29; B60R 21/01512; B60R
1/30; B60R 2011/0022; B60R 2011/004;
B60R 21/013; B60R 2300/806; B60R
1/28; B60R 2300/20; B60R 2300/70;
B60R 2300/802; B60R 2300/804; B60R
1/02; B60R 1/072; B60R 2300/301; B60R
2300/302; B60R 2300/307; B60R
2300/40; B60R 2300/605; B60R
2300/607; B60R 2300/8066; B60R 25/20;
B60R 1/025; B60R 2300/303; B60R 1/00;
B60R 1/074; B60R 1/27; B60R 11/0229;
B60R 16/0231; B60R 16/0237; B60R
16/033; B60R 2001/1215; B60R
2021/0102; B60R 2021/01211; B60R
2021/01315; B60R 2021/01325; B60R
2022/4883; B60R 21/0136; B60R 21/015;
B60R 21/01526; B60R 21/01534; B60R
21/01536; B60R 21/01544; B60R
21/01554; B60R 21/0428; B60R 21/207;
B60R 21/34; B60R 2300/304; B60R
2300/80; B60R 2300/8046; B60R 25/01;
B60R 25/305; B60R 1/06; B60R 1/062;
B60R 1/08; B60R 1/22; B60R 1/31;
B60R 2011/0085; B60R 2021/01272;
B60R 2022/4808; B60R 21/01516; B60R
21/01556; B60R 2300/108; B60R
2300/202; B60R 2300/404; B60R
2300/60; B60R 2300/8013; B60R
2300/8093; G06N 3/08; G06N 3/045;
G06N 20/00; G06N 3/02; G06N 20/20;
G06N 3/04; G06N 3/084; G06N 5/01;
G06N 5/02; G06N 5/046; G01S 19/42;
G01S 13/931; G01S 13/867; G01S
2013/93271; G01S 13/723; G01S 13/86;
G01S 13/87; G01S 17/42; G01S 17/86;
G01S 17/88; G01S 2013/9316; G01S
2013/9318; G01S 2013/93185; G01S
2013/9319; G01S 2013/932; G01S
2013/9321; G01S 2013/9322; G01S
2013/9325; G01S 7/22; G01S 17/48;
G01S 7/4816; G01S 13/003; G01S 13/04;
G01S 13/10; G01S 13/42; G01S 13/50;
G01S 13/522; G01S 13/56; G01S 13/865;
G01S 13/886; G01S 17/931; G01S 19/13;
G01S 2013/9323; G01S 7/12; G01S 7/20;
G01S 7/40; G01S 7/4082; G01S 7/412;
G01S 7/414; G01S 7/415; G01S 13/06;
G01S 13/88; G01S 17/875; G01S 19/485;
H04N 23/45; H04N 19/17; H04N 19/423;
H04N 23/55; H04N 23/57; H04N 23/56;
H04N 7/188; H04N 13/239; H04N
2013/0081; H04N 23/60; H04N 23/90;
H04N 7/18; H04N 7/183; H04N 23/21;
H04N 23/54; H04N 23/695; H04N 23/74;
H04N 7/181; H04N 13/111; H04N
13/204; H04N 13/271; H04N 2013/0092;
H04N 2213/001; H04N 23/11; H04N
23/20; H04N 23/51; H04N 23/65; H04N
23/69; H04N 13/31; H04N 13/327; H04N
13/366; H04N 13/398; H04N 21/23424;
H04N 21/2668; H04N 21/41422; H04N
21/4223; H04N 21/44008; H04N 21/812;
H04N 23/651; H04N 23/661; H04N
23/682; H04N 23/811; H04N 25/704;
H04N 7/185; H04N 9/3147; H04N 9/3182; H04N 9/3194; B60J 5/02; B60J 5/047; B60J 5/0473; B60J 3/06; B60Y 2400/30; B60Y 2400/3015; B60Y 2400/3017; B60Y 2200/15; B60Y 2302/07; G05D 1/0061; G05D 1/0088; G05D 1/0214; G05D 1/617; G05D 1/696; G05D 1/6985; G05D 1/81; G05D 2105/22; G05D 2107/13; G05D 2109/10; G05D 1/0253; G05D 1/0291; G05D 1/0221; G05D 1/0246; G08B 21/06; G08B 21/00; G08B 21/02; G08B 13/19641; G08B 13/19656; G08B 13/19665; G08B 13/2491; G08B 21/22; G08B 21/24; B60N 2210/24; B60N 2/0028; B60N 2/0029; B60N 2220/30; B60N 2/003; B60N 2/0025; B60N 2/0268; B60N 2/0272; B60N 2210/12; B60N 2/0022; B60N 2/0244; B60N 2/0276; B60N 2/0278; B60N 2/879; B60N 2210/42; B60N 2220/10; B60N 2220/20; B60N 2/0023; B60N 2/0035; B60N 2/0273; B60N 2/427; B60N 2/914; B60N 2210/16; B60N 2210/18; B60N 2210/20; B60N 2210/26; B60N 2/0027; B60N 2/02; B60N 2/04; B60N 2/143; B60N 2/809; B60N 2/829; B60N 2/853; B60N 2/865; B60N 2/888; B60N 2/90; B60N 2002/981; B60N 2230/20; G06Q 40/08; G06Q 10/0635; G06Q 30/0207; G06Q 30/0208; G06Q 40/00; G06Q 50/01; G06Q 30/0244; G06Q 30/0631; G06Q 50/40; G09G 2354/00; G09G 2380/10; G09G 3/003; G09G 2340/12; G09G 2320/0626; G09G 2340/04; G09G 2358/00; G09G 2370/02; G09G 3/002; G09G 3/20; G09G 5/10; G09G 5/38; G09G 2320/0261; G09G 2320/0666; G09G 2320/0693; G09G 2320/10; G09G 2340/0492; G09G 2360/144; G09G 2370/20; G09G 3/001; G09G 5/003; G09G 5/02; B62D 21/06; B62D 15/02; B62D 21/152; B62D 21/157; B62D 31/003; B62D 47/006; B62D 1/00; B62D 15/028; B62D 15/0285; B62D 15/029; G07C 5/008; G07C 5/00; G07C 5/08; G07C 5/085; G08G 1/0112; G08G 1/167; G08G 1/0141; G08G 1/0133; G08G 1/0967; G08G 1/096716; G08G 1/096741; G08G 1/096775; G08G 1/096783; G08G 1/096838; G08G 1/0129; G08G 1/143; G08G 1/161; G08G 1/166; G08G 1/01; G08G 1/0175; G08G 1/0962; G08G 1/0116; G08G 1/0145; G08G 1/04; G08G 1/096725; G08G 1/096766; G08G 1/096811; G08G 1/096861; G08G 1/096888; G08G 1/0969; G08G 1/163; G08G 1/164; G01C 21/365; G01C 21/3461; G01C 21/3602; G01C 21/32; G01C 21/3415; G01C 21/3484; G01C 21/3492; G01C 21/3629; G01C 21/3644; G01C 21/3658; G01C 21/3661; G01C 21/3664; G01C 21/3822; G01C 21/3837; G01C 21/3889; G01C 21/3453; G01C 21/36; G01C 21/3605; G01C 21/3614; G01C 21/3635; G01C 21/3638; G01C 21/3641; G01C 21/3647; G01C 21/3811; G01C 3/12; H04W 4/40; H04W 4/44; H04W 4/029; H04W 68/02; H04W 4/80; H04W 4/02; H04W 4/38; H04W 4/46; H04W 84/18; B60H 1/00742; B60H 1/00285; B60H 1/00771; B60H 1/00878; B60H 1/00735; B60H 1/00778; B60H 1/008; B60H 1/00849; B60H 1/00; B60H 3/00; A61B 5/18; A61B 2560/0223; A61B 5/05; A61B 5/1114; A61B 5/163; A61B 5/165; A61B 5/245; A61B 5/6893; B60C 1/00; B60P 3/073; G01G 23/3728; G10K 11/17823; G10K 2210/111; G10K 2210/3044; G10K 2210/3046; G10K 11/178; G10K 11/17813; G10K 2210/1082; G10K 2210/128; G10K 2210/1282; G10K 2210/3038; H04L 67/12; H04L 67/10; H04L 67/306; H04L 2250/16; H04L 2260/32; H04L 2260/42; H04L 2270/42; H04L 3/0015; H04L 50/60; H04L 58/12; H04L 15/2054; H04L 2240/12; H04L 2240/421; H04L 2240/423; H04L 2240/486; H04L 2240/507; H04L 2240/622; H04L 2240/647; H04L 2240/68; H04L 2250/24; H04L 2260/46; H04L 2260/50; G01B 11/026; G01B 11/26; G01B 11/00; G01B 11/03; A63F 13/52; A63F 13/65; B60S 1/023; B60S 1/0818; B60S 1/0844; B60S 1/0896; B60S 1/46; B60S 1/481; E05B 77/02; E05B 77/26; E05B 1/00; E05B 3/00

USPC ... 340/438, 426.22, 431–432, 439, 901–904, 340/925, 953, 994, 995.17, 995.25

See application file for complete search history.

(56) References Cited

U.S. PATENT DOCUMENTS

| | | | |
|---|---|---|---|
| 2020/0017068 A1* | 1/2020 | Moffa | B60N 2/0025 |
| 2020/0175873 A1* | 6/2020 | Xu | G08G 1/005 |
| 2022/0074756 A1* | 3/2022 | Gewickey | G01C 21/3697 |
| 2022/0346207 A1* | 10/2022 | Diamond | G01J 1/4204 |
| 2023/0127977 A1* | 4/2023 | Haskin | H04L 67/12 |
| | | | 340/5.72 |
| 2023/0274367 A1* | 8/2023 | Marotta | G01S 7/4802 |
| | | | 705/4 |
| 2024/0335738 A1* | 10/2024 | Lake-Schaal | A63F 13/795 |

OTHER PUBLICATIONS

United States Patent and Trademark Office. Pending U.S. Appl. No. 17/410,205, filed Aug. 24, 2021, pp. 1-39.
Bond, J. U.S. Appl. No. 17/410,189, filed Aug. 24, 2021.
Bond, J. U.S. Appl. No. 17/410,205, filed Aug. 24, 2021.

* cited by examiner

SYSTEMS AND METHODS FOR COMMUNICATING WITH VISION-IMPAIRED VEHICLE OCCUPANTS

INTRODUCTION

The present disclosure relates to systems and methods associated with vehicles, and more particularly relates to systems and methods for communicating with vision impaired occupants of a vehicle.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems (ADAS), such as cruise control, adaptive cruise control, and parking assistance systems correspond to lower automation levels, while true "driverless" vehicles correspond to higher automation levels.

Vision impaired vehicle passengers may find some vehicle actions (e.g. a sudden swerve) unsettling and may not have full knowledge of the outside scene, which can also be unsettling. Further, embarking and disembarking a vehicle (such as a shared ride vehicle) can be difficult for vision impaired passengers.

Accordingly, it is desirable to provide systems and methods that assist vision impaired vehicle occupants receiving communications from the vehicle. Additionally, it is desirable to provide a variety of information to vision impaired occupants to assist in the comfort and safety of those passengers. Furthermore, other desirable features and characteristics of the present invention will become apparent from the subsequent detailed description and the appended claims, taken in conjunction with the accompanying drawings and the foregoing technical field and background.

Thus, while current systems achieve their intended purpose, there is a need for a new and improved system and method for providing information to a vision impaired passenger of a vehicle related to physical objects and activity within and outside the vehicle.

SUMMARY

According to several aspects of the present disclosure, a system associated with a vehicle includes an occupant output system comprising at least one output device adapted to provide output directed to a single passenger within the vehicle, an occupant monitoring system adapted to track location and movement of the passenger within the vehicle, and at least one processor in operable communication with the occupant output system and the occupant monitoring system, wherein the at least one processor is configured to execute program instructions, wherein the program instructions are configured to cause the at least one processor to receive data from the occupant monitoring system, analyze the data from the occupant monitoring system to determine if the passenger is vision-impaired, analyze the data from the occupant monitoring system to determine a location of the passenger within the vehicle and an orientation of a head of the passenger, and when the passenger is determined to be vision impaired, generate an output for the passenger on the at least one output device, based on the location of the passenger within the vehicle and the orientation of the head of the passenger.

According to another aspect, analyzing the data from the occupant monitoring system includes using a machine learning algorithm.

According to another aspect, the program instructions are further configured to cause the at least one processor to output, via the at least one output device, a sound, and to monitor a response to the sound by the passenger to determine if the passenger is vision-impaired.

According to another aspect, analyzing the data from the occupant monitoring system includes tracking one or both eyes of the passenger.

According to another aspect, the system further includes a plurality of sensing devices adapted to collect image and perception data of an external environment relative to the vehicle and an internal environment of the vehicle, the program instructions further configured to cause the at least one processor to receive image and perception data from the plurality of sensing devices, analyze the image and perception data from the plurality of sensing devices, and generate an output for the passenger that describes physical objects and activity in a field of view of the passenger, based on the location of the passenger within the vehicle and the orientation of the head and eyes of the passenger.

According to another aspect, the at least one processor is in communication with a plurality of vehicle sensors, the program instructions further configured to cause the at least one processor to receive vehicle data from the plurality of vehicle sensors, analyze the vehicle data from the plurality of vehicle sensors, and generate an output for the passenger that describes physical objects and activity external to the vehicle and actions taken by the vehicle in response to unexpected driving maneuvers.

According to another aspect, the system further includes a plurality of sensing devices adapted to collect image and perception data of an external environment relative to the vehicle and an internal environment of the vehicle, and at least one microphone adapted to collect audio from the interior of the vehicle, the program instructions further configured to cause the at least one processor to receive image and perception data from the plurality of sensing devices, and audio data from the at least one microphone, analyze the image, perception and audio data, and generate an output for the passenger that describes physical objects and activity within the interior of the vehicle within context of detected conversations between other passengers within the vehicle.

According to another aspect, the at least one output device is an audio device adapted to provide audible output only to the passenger.

According to another aspect, the at least one output device is one of a directional speaker mounted within the vehicle adapted to provide audible output that is perceptible only by the passenger, and a personal audio device adapted to be worn by the passenger.

According to another aspect, generating the output for the passenger includes translating the output into a preferred language of the occupant.

According to several aspects of the present disclosure, a method of controlling an occupant output system adapted to provide output directed to a single passenger within the vehicle includes tracking a location and movement of a passenger within the vehicle with an occupant monitoring system, receiving, with at least one processor in operable communication with the occupant monitoring system, data from the occupant monitoring system, tracking, with the occupant monitoring system, one or both eyes of the passenger, analyzing, with the at least one processor, the data from the occupant monitoring system to determine a location of the passenger within the vehicle and an orientation of a head and eyes of the passenger, analyzing, with the at least one processor, the data from the occupant monitoring system to determine if the passenger is vision-impaired, and when the passenger is determined to be vision impaired, generating, with the at least one processor, an output for the passenger on the at least one output device, based on the location of the passenger within the vehicle and the orientation of the head of the passenger.

According to another aspect, analyzing the data from the occupant monitoring system includes using a machine learning algorithm.

According to another aspect, the analyzing, with the at least one processor, the data from the occupant monitoring system to determine if the passenger is vision-impaired further includes, outputting, via the at least one output device, a sound, and monitoring a response to the sound by the passenger to determine if the passenger is vision-impaired.

According to another aspect, the method further includes receiving, with the at least one processor, image and perception data of an external environment relative to the vehicle and an internal environment of the vehicle from a plurality of sensing devices, analyzing, with the at least one processor, the image and perception data from the plurality of sensing devices, and generating, with the at least one processor, an output for the passenger, via the at least one output device, that describes physical objects and activity in a field of view of the passenger, based on the location of the passenger within the vehicle and the orientation of the head and eyes of the passenger.

According to another aspect, the method further includes receiving, with the at least one processor, vehicle data from a plurality of vehicle sensors, analyzing, with the at least one processor, the vehicle data from the plurality of vehicle sensors, and generating, with the at least one processor, an output for the passenger, via the at least one output device, that describes physical objects and activity external to the vehicle and actions taken by the vehicle in response to unexpected driving maneuvers.

According to another aspect, the method further includes receiving, with the at least one processor, image and perception data from a plurality of sensing devices, receiving, with the at least one processor, audio data from at least one microphone, analyzing, with the at least one processor, the image, perception and audio data, and generating, with the at least one processor, an output for the passenger, via the at least one output device, that describes physical objects and activity within the interior of the vehicle within context of detected conversations between other passengers within the vehicle.

According to several aspects of the present disclosure, an occupant output system associated with a vehicle includes at least one audio output device adapted to provide output directed only to a single passenger within the vehicle, the at least one audio output device comprising one of a directional speaker mounted within the vehicle adapted to provide audible output that is perceptible only by the passenger, and a personal audio device adapted to be worn by the passenger, an occupant monitoring system adapted to track location and movement of the passenger within the vehicle and track one or both eyes of the passenger, at least one processor in operable communication with the occupant output system and the occupant monitoring system, wherein the at least one processor is configured to execute program instructions, wherein the program instructions are configured to cause the at least one processor to receive data from the occupant monitoring system, analyze the data from the occupant monitoring system, output a sound, and monitor a response to the sound by the passenger to determine if the passenger is vision-impaired, analyze the data from the occupant monitoring system to determine a location of the passenger within the vehicle and an orientation of a head and eyes of the passenger, when the passenger is determined to be vision impaired, generate an output for the passenger, translate the output into a preferred language of the occupant, and provide the output, on the at least one output device, to the passenger based on the location of the passenger within the vehicle and the orientation of the head of the passenger.

According to another aspect, the system further includes a plurality of sensing devices adapted to collect image and perception data of an external environment relative to the vehicle and an internal environment of the vehicle, the program instructions further configured to cause the at least one processor to receive image and perception data from the plurality of sensing devices, analyze the image and perception data from the plurality of sensing devices, and generate an output for the passenger that describes physical objects and activity in a field of view of the passenger, based on the location of the passenger within the vehicle and the orientation of the head and eyes of the passenger.

According to another aspect, the at least one processor is in communication with a plurality of vehicle sensors, the program instructions further configured to cause the at least one processor to, receive vehicle data from the plurality of vehicle sensors, analyze the vehicle data from the plurality of vehicle sensors, and generate an output for the passenger that describes physical objects and activity external to the vehicle and actions taken by the vehicle in response to unexpected driving maneuvers.

According to another aspect, the system further includes a plurality of sensing devices adapted to collect image and perception data of an external environment relative to the vehicle and an internal environment of the vehicle, and at least one microphone adapted to collect audio from the interior of the vehicle, the program instructions further configured to cause the at least one processor to receive image and perception data from the plurality of sensing devices, and audio data from the at least one microphone, analyze the image, perception and audio data, and generate an output for the passenger that describes physical objects and activity within the interior of the vehicle within context of detected conversations between other passengers within the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
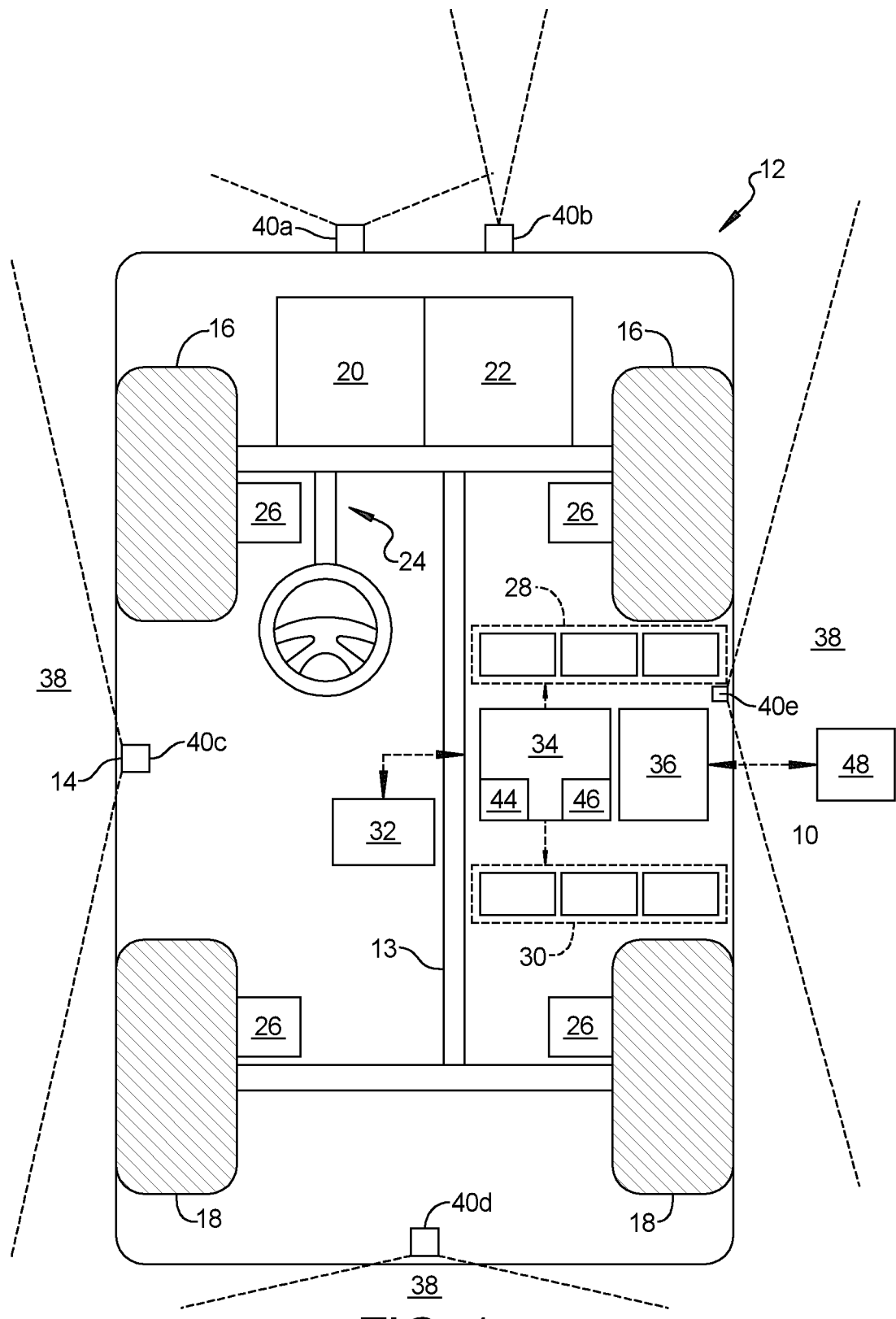
FIG. 1 is a schematic view of a vehicle with a system according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "occupant" or "passenger" includes persons located in the vehicle (e.g. on a seat of the vehicle) and also persons intending to, or about to, board the vehicle.

With reference to FIG. 1, an occupant output system shown generally at 10 is associated with a vehicle 12 in accordance with various embodiments. In general, the occupant output system 10 provides information specifically tailored to a single vision impaired passenger of the vehicle 12. The occupant output system 10 may also provide passenger specific information to each one of multiple vision impaired passengers within the vehicle 12. The information communicated by the occupant output system 10 can include information on actions taken by the vehicle 12, and other contextual information, to vision impaired occupants. The communicated information can be determined by fusing environment data and vehicle control data. The occupant output system 10 can generate the output using neural machine translation to a preferred language of the occupant. The occupant output system 10 may automatically detect if an occupant is vision impaired by monitoring eye movements and reaction to sounds. In the embodiment of FIG. 1, the occupant output system 10 is shown as included within the vehicle 12 but a distributed system can be provided with some parts included in an occupant's personal electronic device (e.g. a smartphone or tablet), some parts located in a cloud processing system and some parts located on-board the vehicle 12 or any combination thereof.

As depicted in FIG. 1, the vehicle 12 generally includes a chassis 13, a body 14, front wheels 16, and rear wheels 18. The body 14 is arranged on the chassis 13 and substantially encloses components of the vehicle 12. The body 14 and the chassis 13 may jointly form a frame. The front wheels 16 and the rear wheels 18 are each rotationally coupled to the chassis 13 near a respective corner of the body 14.

In various embodiments, the vehicle 12 is an autonomous vehicle and the occupant output system 10 is associated with the vehicle 12. The vehicle 12 is, for example, a vehicle that is automatically controlled to carry passengers from one location to another. The vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, shared passenger vehicles, coaches, etc., can also be used. In an exemplary embodiment, the vehicle 12 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. However, in other embodiments, the vehicle 10 is of a lower level of automation and includes advanced driver assistance systems (ADAS).

As shown, the vehicle 12 generally includes a propulsion system 20, a transmission system 22, a steering system 24, a brake system 26, a sensor system 28, an actuator system 30, at least one data storage device 32, at least one controller 34, and a connected system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16, 18. The brake system 26 may, in various embodiments, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some embodiments contemplated within the scope of the present disclosure, the steering system 24 may not include a steering wheel.

Figure 2:
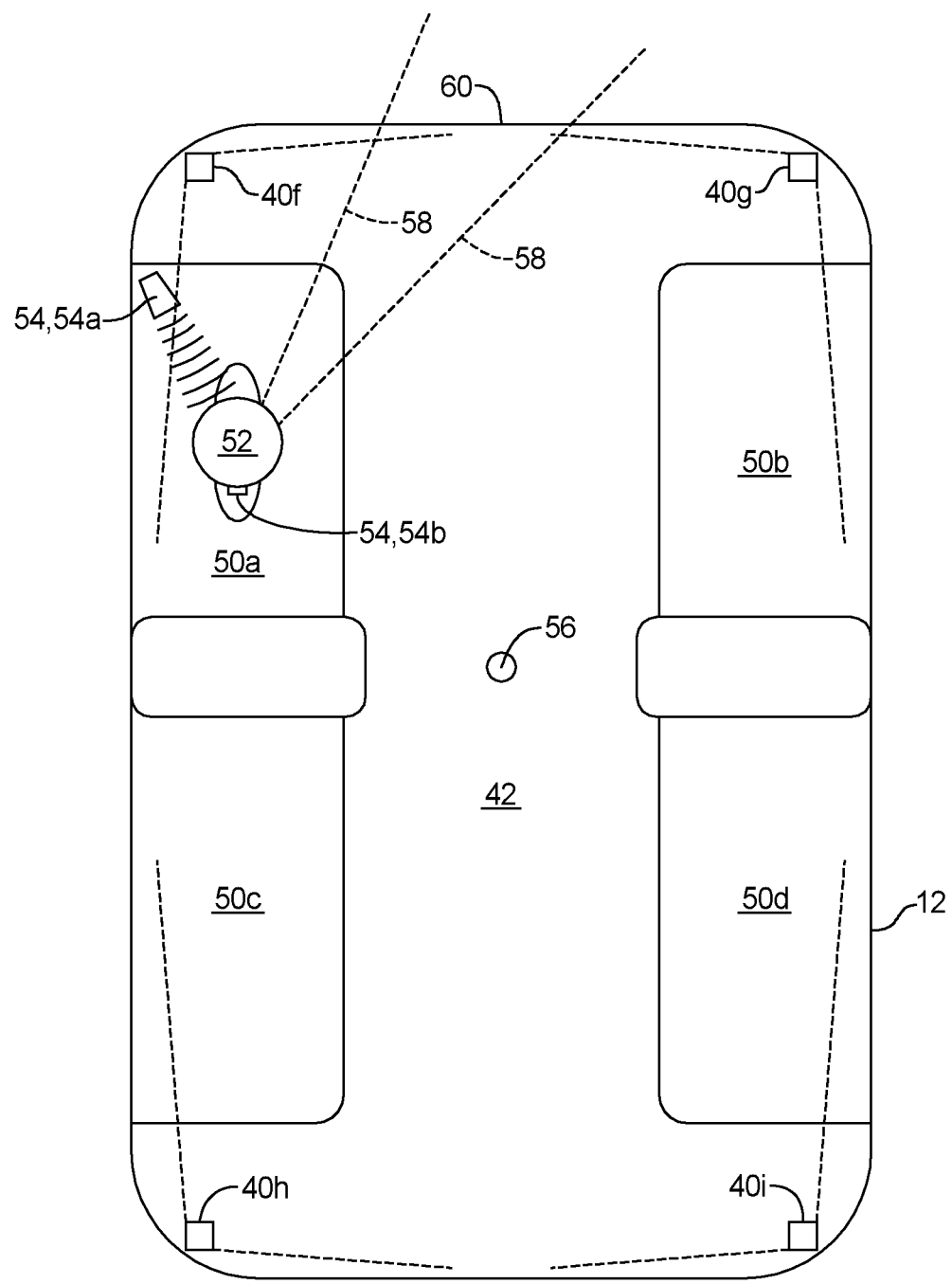
FIG. 2 is a schematic top view of an interior of the vehicle shown in FIG. 1.

The sensor system 28 includes one or more sensing devices that sense observable conditions and collect image and perception data of the exterior environment and/or the interior environment of the vehicle 10. The sensing devices 40a-40i can include, but are not limited to, radars, lidars, global positioning systems, optical cameras, thermal cameras, ultrasonic sensors, and/or other sensors. As shown, in FIG. 1, the sensor system 28 includes sensors 40a, 40b mounted to a front of the vehicle 12, sensor 40c mounted to a left side of the vehicle 12, sensor 40d mounted to a rear of the vehicle 12, and sensor 40e mounted to a right side of the vehicle 12. The sensors 40a-40e are adapted to collect image and perception data from an environment external to and surrounding the vehicle. Referring to FIG. 2, the sensor system 28 includes sensors 40f, 40g, 40h, 40i mounted within an interior 42 of the vehicle 12 and adapted to collect image and perception data from the interior 42 of the vehicle 12.

The actuator system 30 includes one or more actuator devices that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The connected system 36 is configured to wirelessly communicate information to and from other entities 48, such as but not limited to, other vehicles ("V2V" communication,) infrastructure ("V2I" communication), remote systems, and/or personal devices. In an exemplary embodiment, the connected system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the vehicle 12. In various embodiments, the data storage device 32 stores defined maps of the navigable environment. In various embodiments, the defined maps may be predefined by and obtained from a remote system (e.g. a cloud processing system). For example, the defined maps may be assembled by the remote system and communicated to the vehicle 12 (wirelessly and/or in a wired manner) and stored in the data storage device 32. As can be appreciated, the data storage device 32 may be part of the vehicle controller 34, separate from the vehicle controller 34, or part of the vehicle controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 12.

The instructions may include one or more separate programs, each of which comprises an ordered listing of executable program instructions for implementing logical functions. The program instructions, when executed by the processor 44, receive and process signals from the sensor system 28, perform logic, calculations, methods and/or algorithms for automatically controlling the components of the vehicle 12, and generate control signals to the actuator system 30 to automatically control the components of the vehicle 12 based on the logic, calculations, methods, and/or algorithms. Although only one controller 34 is shown in FIG. 1, embodiments of the vehicle 12 can include any number of controllers 34 that communicate over any suitable communication medium or a combination of communication mediums and that cooperate to process the sensor signals, perform logic, calculations, methods, and/or algorithms, and generate control signals to automatically control features of the vehicle 12.

In various embodiments, one or more program instructions of the controller 34 are embodied in the occupant output system 10 and, when executed by the processor 44, perform the functions described herein. Further, the processor 44 is configured by the program instructions to explain environment and vehicle contextual information to the occupant and output the explanation for the vision impaired passenger. The explanations may be provided for ADAS equipped vehicles or for vehicles with higher levels of automation. Yet further, the processor 44 is configured by the program instructions to automatically determine when a vision impaired passenger is present without having previously interacted with such individual.

Referring to FIG. 2, within the interior environment 42 of the vehicle, a plurality of seating positions 50a, 50b, 50c, 50d are provided for passengers within the vehicle 12. As shown, a passenger 52 seated in seating position 50a has been identified by the system 10 as a vision impaired passenger. At least one output device 54 is an audio device that is positioned in proximity to the seating position 50a, such that the system 10 can provide output to the vision impaired passenger 52 that is specifically tailored for the vision impaired passenger 52 and can only be heard by the vision impaired passenger 52. In an exemplary embodiment, the at least one output device 54 is a directional speaker 54a mounted within the vehicle 12 interior 42 and positioned to provide audible information specifically and exclusively to the vision impaired passenger 52. In another exemplary embodiment, the at least one output device 54 is a personal audio device adapted to be worn by the vision impaired passenger 52 and in wireless communication with the occupant output system 10, such a wireless headphones or an earbud. At least one output device 54 is positioned within the interior 42 of the vehicle 12 for each seating position 50a, 50b, 50c, 50d to provide unique information for a vision impaired passenger seated at any one of the seating positions 50a, 50b, 50c, 50d.

The vehicle 12 described with regard to FIG. 1 may be suitable for use in the context of a taxi, bus or shuttle system in a certain geographical area (e.g., a city, a school or business campus, a shopping center, an amusement park, an event center, or the like) or may simply be managed by a remote system. For example, the vehicle 12 may be associated with an autonomous vehicle based remote transportation system. In various embodiments, the operating environment further includes one or more user devices (not shown) that communicate with the vehicle 12 and/or the remote transportation system (not shown) via a communication network (not shown). A registered user of the remote transportation system can create a ride request via the user device. The ride request will typically indicate the passenger's desired pickup location (or current GPS location), the desired destination location (which may identify a predefined vehicle stop and/or a user-specified passenger destination), and a pickup time. The remote transportation system receives the ride request, processes the request, and dispatches a selected autonomous vehicle to pick up the passenger at the designated pickup location and at the appropriate time.

Figure 3:
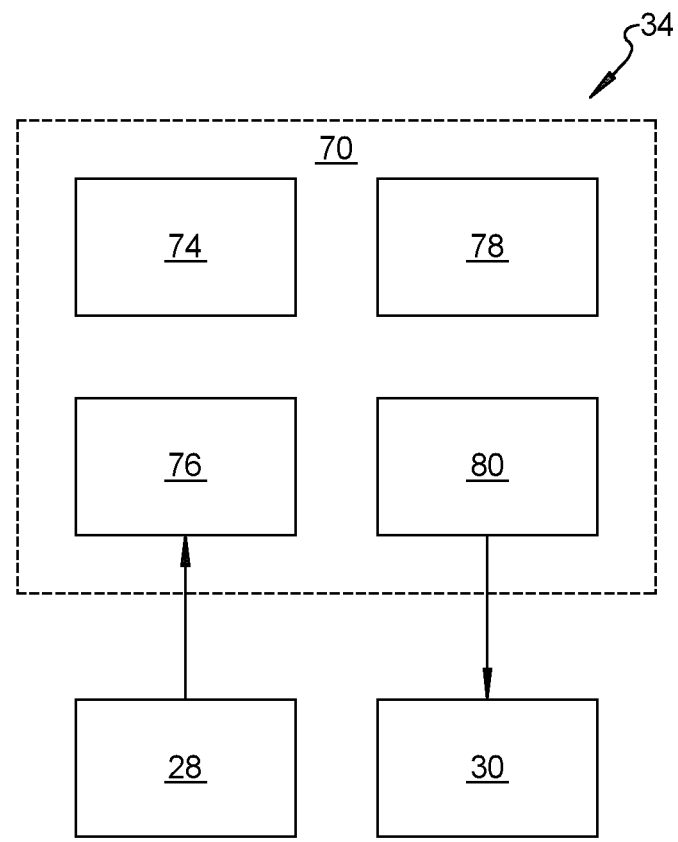
FIG. 3 is a schematic diagram of an autonomous driving system that is associated with the occupant output system of the present disclosure.

Referring now to FIG. 3, and with continued reference to FIG. 1 and FIG. 2, in accordance with an exemplary autonomous driving application, the vehicle controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 12.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 12. In various embodiments, the computer vision system 74 can incorporate information from multiple sensors, including but not limited to cameras, lidars, radars, and/or any number of other types of sensors. The computer vision system 74 provides perception data that can be used by the occupant output system 10 to derive environmental contextual data useful for generating occupant messages describing the environment of the vehicle 12 to a passenger.

The positioning system 76 processes sensor data along with other data to determine a position (e.g., a local position relative to a map, an exact position relative to lane of a road, vehicle heading, velocity, etc.) of the vehicle 12 relative to the environment. The guidance system 78 processes sensor data along with other data to determine a path for the vehicle 12 to follow. The vehicle control system 80 generates control signals for controlling the vehicle 12 according to the determined path. The position of the vehicle 12 in the environment may also be useful for deriving environmental contextual data for generating occupant messages describing the environment of the vehicle 12 to a passenger. The control signals for controlling the vehicle 12 provide vehicle contextual data for generating occupant messages describing actions taken by the vehicle 12 to a passenger.

Environmental contextual data and vehicle contextual data can also be generated in vehicles equipped with ADAS systems using data from the sensor system 28 and ADAS vehicle control commands. In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the occupant output system 10 of FIG. 1 is associated with the autonomous driving system 70 and may also be associated with further computer implemented devices and cloud processing systems.

Figure 4:
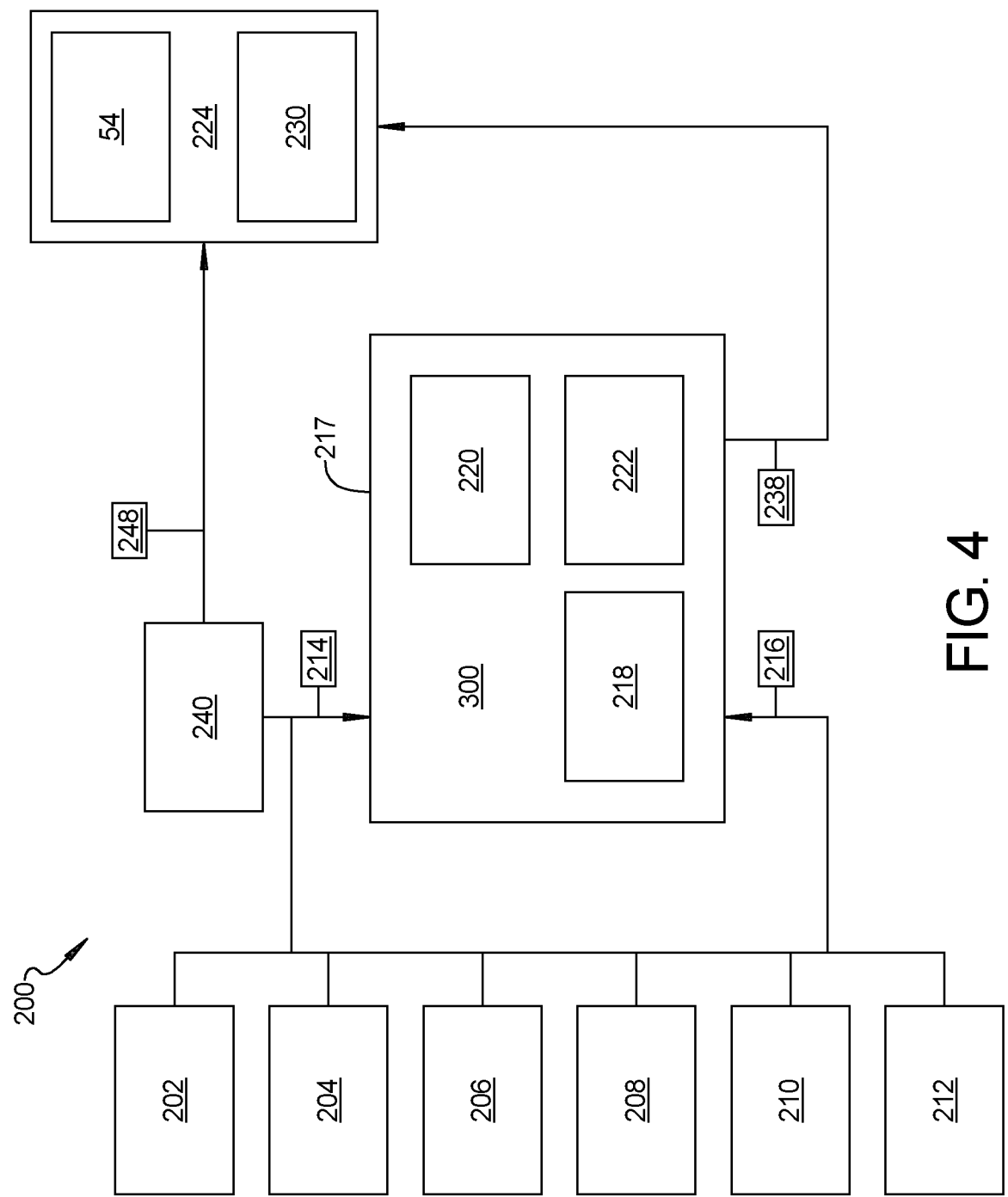
FIG. 4 is a schematic diagram of the occupant output system of the present disclosure.

The occupant output system 10 will now be described in greater detail with reference to FIG. 4. The occupant output system 10 includes sources of vehicle and passenger context data including a driving control source 202, external cameras 204, internal cameras 206, a mapping module 208, a V2X module 210 and other environment data sources 212. Any suitable source of information that allows the occupant output system 10 to impute information on the environment internal and external to the vehicle 12 and actions of the vehicle 12 can be included. The driving control source 202 can be the vehicle control system 80 of FIG. 2, an ADS control system or other source of vehicle controls or state that allows the occupant output system 10 to determine what actions have or will be taken by the vehicle 12 and to use that information to generate a message to be conveyed to an occupant. The external cameras 204 (which can be included as part of the sensor system 28) can image the external scene around the vehicle 12 to allow the environment of the vehicle 12 to be ascertained by the occupant output system 10. Other external perception systems can be included such as LiDAR, RADAR, ultrasound, etc. In some embodiments, a fusion of perception data from different sources can be used to generate data describing the vehicle environment, which, in turn, allows relevant messages describing the environment to be generated by the occupant output system 10. Further, the external cameras 204 or other perception sensor can allow a location of a passenger wishing to board the vehicle 10 to be determined. Internal cameras 206 (which can be included as part of the sensor system 28) allow imaging of occupants within the interior 42 of the vehicle 12 to be taken, which can be useful in deriving passenger information, particularly for automatically detecting whether a passenger is vision impaired. The mapping module 208 can be similar to the positioning system 76 described above or a more standard navigation tool. Generally, the mapping module 208 will include detailed information on the environment of the vehicle 12 including names and types of places, which provide useful environment context data for generating descriptive messages to a user of the environment of the vehicle 12. The V2X module 210 allows information to be obtained from the environment including other vehicles, building devices, pedestrian devices, advertising devices, infrastructure, advisory devices, etc. Such information can be a rich source of environmental information for use in generating relevant messages to an occupant of the vehicle 12. Many other environment data sources 212 can be used in the occupant output system 10 to provide context data for use in generating messages for an occupant. In the embodiment of FIG. 4, the various types of data sources have been categorized as providing occupant context data 214 and vehicle context data 216. The occupant context data 214 includes passenger identification information or information relevant for identifying a passenger and the vehicle context data 216 includes information describing actions taken by the vehicle 12 and external environmental information.

In the exemplary embodiment of FIG. 4, the occupant output system 10 includes an occupant message generation module 217 and an occupant output module 224. The occupant message generation module 217 receives the vehicle context data 216 and the occupant context data 214. The occupant message generation module 217 includes a vehicle context explanation sub-module 218 for generating messages describing actions and environmental context of the vehicle 12. The occupant message generation module 217 includes an occupant localization sub-module 222 and an occupant guidance sub-module 220 for locating an occupant inside the vehicle 12.

The vehicle context explanation sub-module 218 receives the vehicle context data 216 providing information on the outside environment and also providing information on actions taken by the vehicle 12. In an exemplary embodiment, the program instructions are further configured to cause the at least one processor to receive vehicle context data 216 from the plurality of vehicle sensors 40A-40*i*, analyze the vehicle context data 216, and generate an audio output for the vision impaired passenger 52 that provides a description of physical objects and activity external to the vehicle 12 and actions taken by the vehicle 10 in response to unexpected driving maneuvers. The at least one output device 54 is associated with the occupant output module 224. The at least one output device 54 is an audio device that is adapted to provide audible output only to the vision impaired passenger 52. As discussed above, the at least one output device 54 may be one or more directional speakers 54*a* adapted to provide audible output that is only perceptible by the vision impaired passenger 52, or the at least one output device 54 may be a personal audio device 54*b*, such as headphones or an ear-bud, that a vision impaired passenger may wear with them and automatically connects wirelessly with the occupant output module 224 when the vision impaired passenger enters the vehicle 12.

Information on the outside environment can include mapping information from the mapping module 208 such as location names, landmarks, shops, amenities, facilities, planned maneuvers, upcoming stops, traffic information, travel time remaining, etc., which may be of interest to a visually impaired person to provide context to their journey. The information can include information on any maneuvers that are noteworthy such as a sudden stop, a sudden turn or swerve, a lane change, a change of speed, etc. Such information is derived from the driving control source 202 and may be a filtered version of control commands when vehicle acceleration as indicated by, for example, an Inertial Measurement Unit, is beyond a certain threshold. For example, if the vehicle 12 makes a hard braking maneuver because a dog crosses the road in front of the vehicle 12, the occupant output system 10 will provide an audible description to the passenger explaining why the hard braking maneuver was executed, and could further offer details to the passenger describing the outcome, ie. the vehicle 12 avoided hitting the dog. Other information derived from the driving control source 202 can be vehicle state information such as fuel/battery level, use of horn, signals, etc. The vehicle context data 216 can include perception information such as that derived from external cameras 204. The perception information can be based on a labelled version of the outside environment as perceived by the sensor system 28 of the vehicle 12 after processing by one or more machine learning identification algorithms, which may be included in the computer vision system 74. Other environment data sources 212 can include a source of weather information, particularly when there is a change of weather that may favorably be explained to the passenger.

The vehicle context explanation sub-module 218 can resolve the vehicle context data 216 into messages. The vehicle context data 216 may provide information only for a limited upcoming time or distance window to ensure relevancy. Alternatively, the vehicle context explanation sub-module 218 may filter the received information to an upcoming time or distance limited window. For example, information that is related to an upcoming window of 200 feet (which may be a certain period of time based on current speed) may be processed. The vehicle context explanation sub-module 218 can algorithmically process the vehicle context data 216 into discrete messages that are embodied in message data 238, which is sent to the occupant output module 224. Exemplary messages can include: "entering [TOWN/CITY NAME]", "[BANK NAME] on the right", "sudden swerve to avoid vehicle ahead", "hail storm", "due to traffic, arrival time has been delayed by [X] minutes", "turning left", "changing lanes", "on freeway", "icy conditions", "stopping at traffic lights", "park area on the right", etc. Any information on the outside environment and actions taken by the vehicle 12 that can be perceived, known or derived from the various data sources can be compacted into a relevant message and sent in message data 238 to the occupant output module 224.

In the exemplary embodiment, the occupant localization sub-module 222 is provided to locate a vision impaired passenger within the vehicle 12. The occupant localization sub-module 222 may receive an indication that a passenger (or would-be passenger) is vision impaired. This indication can be provided in the form of a notification from an application on an occupant device 240 or may be automatically determined as described with reference to FIG. 5. The indication can be provided as part of occupant context data 214. The occupant context data 214 can additionally include information enabling a location of the vision impaired person to be determined. This information may be a transmission signal from the occupant device 240 that allows triangulation (or other processing algorithm to locate a device based on received signal) by the signal receiver (and associated processing software) included in the connected system 36 of the vehicle 10. The transmission signal can be Bluetooth, ultrawideband, etc. Alternatively, once the passenger has been identified based on a signal from the occupant device 240, image processing may be performed to broadly locate the passenger within image data using real-word space to image space projection processing, which requires knowledge of camera intrinsic data. The image data can be provided by the external cameras 204 or the internal cameras 206 and included as part of the occupant context data 214. The broad or rough estimate of the passenger within the image data can then be refined using image processing to identify a passenger within the image. By performing a reverse process of image space to real-world space projection, refined coordinates for the location of the passenger can be obtained. The coordinate system may be in the frame of reference of the vehicle 12. Whichever specific algorithm is used to locate the passenger relative to the vehicle 12, three-dimensional (3D) coordinates for the passenger are generated by the occupant localization sub-module 222, which are sent to the occupant guidance sub-module 220. Other data modalities can be included to determine a position of the passenger such as processing of Lidar, Radar or other imaging modalities to locate the position of the passenger relative to the vehicle 12.

A neural machine translation module 230 may convert the output messages included in the message data 238 into a preferred language of the occupant. A default preferred language may be chosen by the occupant output system 224 depending on the language of the country in which the vehicle 12 was marketed.

The translated (if necessary) messages from the neural machine translation module 230 can be converted to speech (using text to speech processing) and provided to the audio output device 54. As detailed above, the output messages may not be all of the messages included in the message data 238 as user preferences, and differing assistance requirements can result in a filtering of the messages provided so as to ensure relevancy.

It should be appreciated that the functionality of the vehicle context explanation sub-module 218 and the occupant guidance sub-module 220 do not necessarily both need to be provided. That is, both functionalities are independently useful. Thus, a system could be provided that either provides an explanation of vehicle actions and the external environment or provides movement guidance to a passenger in and around the vehicle 12. However, the combination of these functionalities provides enhanced utility for vision impaired persons.

Figure 5:
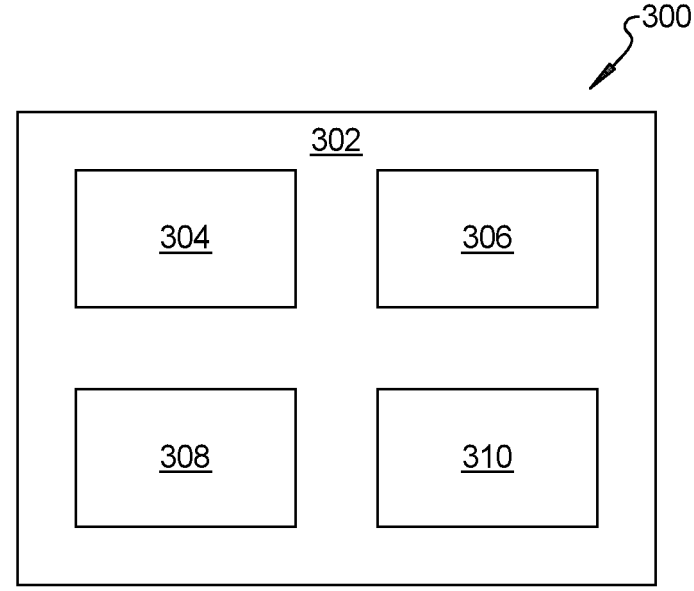
FIG. 5 is a schematic diagram of a detection system for automatically detecting a vision impaired passenger associated with the occupant output system of the present disclosure.

With additional reference to FIG. 5, a detection system 300 for automatically detecting if any occupant of the vehicle 12 is vision or hearing impaired in accordance with an embodiment. The detection system 300 includes an occupant monitoring system 302 that is adapted to track location and movement of the passenger within the vehicle 10. The occupant monitoring system 302 includes a camera 304, a sound generator 306, an occupant identification module 308 and an image analysis module. The camera 304 may be one of the internal cameras 206 of FIG. 4. The at least one processor 44 is in operable communication with the occupant output system 10 and the occupant monitoring system 302. The at least one processor 44 is configured to execute program instructions to cause the at least one processor 44 to receive data from the occupant monitoring system 302 and analyze the data from the occupant monitoring system 302 to determine if the passenger is vision impaired. The at least one processor 44 is further configured to execute program instructions to cause the at least one processor 44 to analyze the data from the occupant monitoring system 302 to determine the location of the passenger within the vehicle 12, and the orientation of the head and eyes of the passenger. The camera 304 provides frames of image data (i.e. video data) for each occupant to the image analysis module 310 for analysis to determine if the occupant has vision impairment and to determine the location and orientation of the head and eyes for each occupant.

The image analysis module 310 receives frames of image data from the camera 304 and can perform a variety of algorithmic processes to determine if the occupant is vision impaired. In one process, eye movements are extracted from the image data, which can be indicative of vision impaired persons. In another process, the sound generator 306 (the at least one output device 54) provides a sound and the image data is analyzed to gauge any reaction to the sound. In one example, the sound is directional (e.g. from one side of a stereo speaker system of the vehicle 12) and the analysis detects head movement toward the sound. In another example, a vehicle light can be activated in the vehicle 10. For example, flashing lights can be used. The image data can be analyzed to gauge any reaction to the light, which can be indicative of whether a person is vision impaired. In another example, the image analysis module 310 can detect vision impaired persons by analyzing how the occupant moves around the cabin, which will likely be different from non-vision impaired persons. A combination of such techniques can also be used. In one embodiment, a machine learning algorithm is included in the image analysis module 310, which is trained based on a stock of labelled (e.g vision impaired, non-vision impaired) input image data. Although the present embodiment has been described in the context of image analysis, other perception modalities could be applicable. For example, lidar data could be provided additionally, or alternatively, to the image data, which could be monitored (processed) for characteristic movements of vision impaired persons.

The detection of vision impaired persons by the image analysis module 310 can be sent to the occupant output module 224 so that messages are provided to the vision impaired occupant. Further, the detection result can be saved in the database of occupant profile(s) along with an occupant identifier 248 or biometric data extracted from image data taken by the camera 304.

In another exemplary embodiment of the present disclosure, the occupant output system 10 further includes at least one microphone 56 within the interior 42 of the vehicle 12 to collect audio data of sounds and communications within the vehicle 12. The program instructions are further configured to cause the at least one processor 44 to receive image and perception data from the plurality of sensing devices 40a-40i and audio data from the at least one microphone 56. The at least one processor 44 analyzes all the audible data collected from the interior 42 of the vehicle 12, and the occupant output module 224 outputs an audible description for the vision impaired passenger 52 describing the context of sounds that may be heard by the vision impaired passenger 52. For example, another passenger may drop an item which makes a large thump on impact with a floor of the vehicle 12. The processor 44 uses image and perception data from the plurality of sensing devices 40a-40i to associate the dropping of the object with the audible noise from the impact. The occupant output module 224 will provide an output to the vision impaired passenger 52 explaining the source of the impact noise. In another example, other passengers within the vehicle 12 may react with sounds of excitement or shock due to something happening outside of the vehicle 12. The processor 44 will use image and perception data collected within the vehicle 12 to determine that the other passengers are looking out a window on the left side of the vehicle 12, and further, will use image and perception date collected of the exterior environment 38 surrounding the vehicle to identify the cause of the reaction (ie. a severe collision/accident). The occupant output module 224 will provide an output to the vision impaired passenger 52 explaining that the audible reactions of the other passengers is in reaction to the vehicle 12 passing a collision/accident.

In other embodiments, the system 10 may include external microphones that collect audio data external to the vehicle 12, wherein the occupant output module 224 may provide output to the vision impaired passenger 52 describing the cause of sounds external to the vehicle 12 perceived by the vision impaired passenger 52. In other embodiments, voice recognition and artificial intelligence may be used by the system 10 to listen and understand conversations taking place within the vehicle 12. When other passengers are having a conversation around a physical item within the cabin (luggage, people, personal items) or scenes/objects external to the vehicle 12 (landmarks, other vehicles, restaurant, etc.) the system 10 identifies the object of the conversation and delivers a description to the visually impaired passenger 52 to assist the visually impaired passenger 52 to participate in the conversation.

In additional or alternative embodiments of the present disclosure, the occupant output system 10 combines environment information and vehicle action information to create a contextual explanation of actions for output. The occupant output system 10 uses neural machine translation to generate audio in a chosen auditory language, and finally outputs the generated audio. Accordingly, the present disclosure enables vision impaired occupants to understand the actions taken by an automated driver-assistance system (ADAS) or a more fully autonomous vehicle by combining relevant environment details with an explanation of the actions of the vehicle 12 and provides this information specifically and exclusively to the vision impaired passenger 52.

In one exemplary embodiment, the program instructions are configured to cause the at least one processor 44 to receive image and perception data from the plurality of sensing devices 40a-40i, and generate an output for the vision impaired passenger 52 that describes physical objects and activity in a field of view of the vision impaired passenger 52 based on the location of the passenger within the vehicle 12 and the orientation of the head and eyes of the passenger 52. Referring again to FIG. 2, a vision impaired passenger 52 has been identified by the system 10 seated at seating position 50a. The occupant monitoring system 302 tracks the orientation of the passenger's head and eyes to determine that the field of view of the passenger (if the passenger were not vision impaired) is directed as indicated by lines 58. As shown, the orientation of the passenger's head and eyes indicate that the field of view of the passenger is outward through a front window 60 of the vehicle 12. Thus, the processor 44 will collect data from the plurality of sensing devices 40a-40i, and contextual data of the external environment surrounding the vehicle 12 to identify physical objects and activity outside of the vehicle 12 within the field of view of the vision impaired passenger 52, and provide an output, via the output device 54, that describes such physical objects and activity to the passenger 52.

Figure 6:
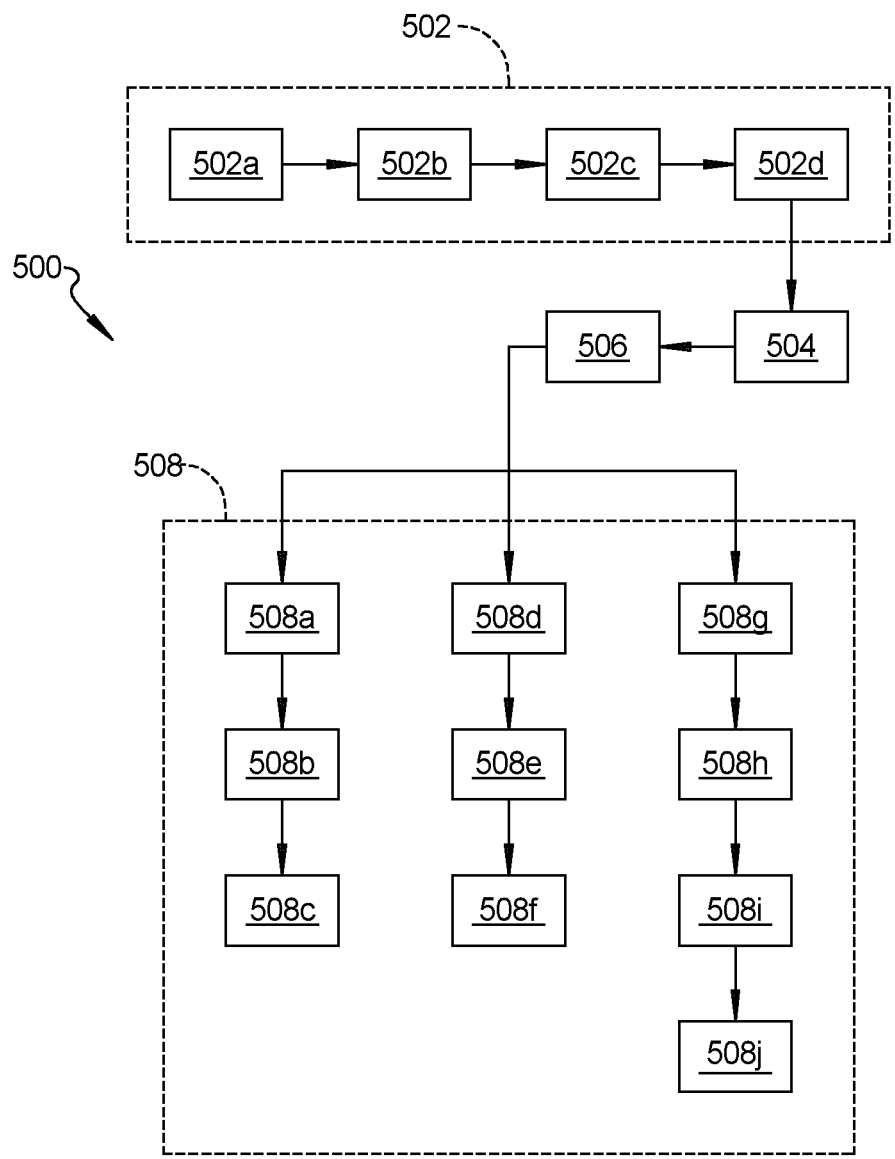
FIG. 6 is a flowchart illustrating a method of communication with vision impaired occupants of a vehicle according to an exemplary embodiment.
Figure 7:
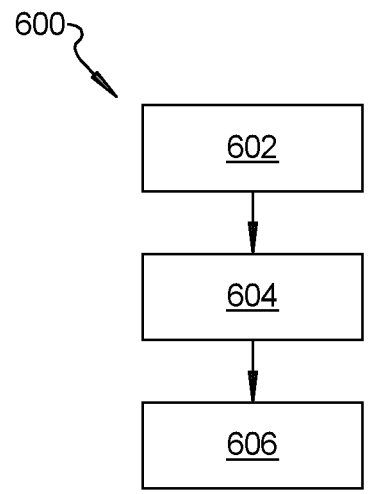
FIG. 7 is a flow chart illustrating a method of automatically detecting vision impaired occupants within a vehicle according to an exemplary embodiment.

Referring now to FIGS. 6 and 7, and with continued reference to FIGS. 1-5, flowcharts illustrate methods 500, 600 that can be performed by the occupant output system 10 described with respect to FIGS. 1 to 4 in accordance with the present disclosure. As can be appreciated in light of the disclosure, the order of operation within the method is not limited to the sequential execution as illustrated in FIGS. 6 and 7, but may be performed in one or more varying orders as applicable and in accordance with the present disclosure. In various embodiments, the methods 500, 600 can be scheduled to run based on one or more predetermined events, and/or can run continuously during operation of the vehicle 12. Exemplary predetermined events can be at each stop to pick up a passenger, at each start of the vehicle 12, each approach to the vehicle 12 by a new occupant (would-be occupant) or each opening of a door of the vehicle 12.

FIG. 6 illustrates a method of communicating with a vision impaired person. In step 502, vehicle and/or occupant context data 214, 216 is received from the various data sources of the occupant output system 10. The vehicle context data 216 can include environment information concerning the scene outside the vehicle 10 and information (e.g. derived from automatic driving commands) on actions taken by the vehicle 12. The occupant context data 214 can particularly relate to information enabling a precise 3D location of the would-be occupant to be determined. At block 502a, the method 500 includes tracking a location and movement of the passenger within the vehicle 12 with the occupant monitoring system 302. At block 502b, the method 500 includes receiving, with the at least one processor 44 that is in operable communication with the occupant monitoring system 302, data from the occupant monitoring system 302. At block 502c, the method 500 includes tracking, with the occupant monitoring system 302, one or both eyes of the passenger, and, at block 502d, the method 500 includes analyzing, with the at least one processor 44, the data from the occupant monitoring system 302 to determine a location of the passenger within the vehicle 12 and an orientation of a head and eyes of the passenger.

Moving to block 504, message data 238 is generated. The message data 238 can include explanations of vehicle actions and/or the outside environment based on the vehicle context data 216. The message data 238 can also, or alternatively, include movement guidance based on the occupant context data 214 to assist a vision impaired person in boarding the vehicle, finding a seat, buckling a seat belt and/or disembarking the vehicle 12.

Moving to block 506, a determination is made whether an occupant is vision impaired. This can be performed by looking-up the database of occupant profile(s) 246 or by automatic detection as will be described with respect to FIG. 6. The method 500, at block 506, includes analyzing, with the at least one processor 44, the data from the occupant monitoring system 302 to determine if the passenger is vision-impaired.

Moving to block 508, an output for the occupant is generated according to the preferred language of the passenger. The neural machine translation module 230 can translate the messages into the preferred language. The translated messages can be converted into speech and output through the at least one output device 244.

In one exemplary embodiment, moving to block 508a, the method 500 includes receiving, with the at least one processor 44, image and perception data of an external environment relative to the vehicle 12 and an internal environment of the vehicle 12 from the plurality of sensing devices and, moving to block 508b, analyzing, with the at least one processor 44, the image and perception data from the plurality of sensing devices 40a-40i. Moving to block 508c, the method 500 further includes generating, with the at least one processor, an output for the passenger, via the at least one output device 54, that describes physical objects and activity in a field of view of the passenger, based on the location of the passenger within the vehicle 12 and the orientation of the head and eyes of the passenger.

In another exemplary embodiment, moving to block 508d, the method 500 includes receiving, with the at least one processor 44, vehicle data (vehicle context data 216) from a plurality of vehicle sensors (driving control source 202, external cameras 204, internal cameras 206, mapping module 208, V2X module 210 and environment data sources 212). Moving to block 508e, the method 500 includes analyzing, with the at least one processor 44, the vehicle data from the plurality of vehicle sensors, and, moving to block 508f, generating, with the at least one processor 44, an output for the passenger, via the at least one output device 54, that describes physical objects and activity external to the vehicle 12 and actions taken by the vehicle 12 in response to unexpected driving maneuvers.

In still another exemplary embodiment, moving to block 508g, the method 500 includes receiving, with the at least one processor 44, image and perception data from the plurality of sensing devices 40a-40i, and, moving to block 508h, receiving, with the at least one processor 44, audio data from at least one microphone 56. Moving to block 508i, the method 500 further includes analyzing, with the at least one processor 44, the image, perception and audio data, and, moving to block 508j, generating, with the at least one processor 44, an output for the passenger, via the at least one output device 54, that describes physical objects and activity within the interior 42 of the vehicle 12 within context of detected conversations between other passengers within the vehicle 12.

Referring to FIG. 7, an exemplary method 600 of automatically detecting vision impaired occupants in the vehicle 12 is shown. Beginning at block 602, frames of image data (e.g. video data) is received from the camera 304. Moving to block 604, the image data is analyzed to determine whether the occupant of the vehicle 12 is vision impaired. In one embodiment, the analysis includes processing by a machine learning algorithm that has been trained to detect vision impaired occupants. The analysis may include detecting irregular eye movements, which can be indicative of a vision impaired person. The analysis may include irregular movement internal to a cabin of the vehicle 12, which can be indicative of a vision impaired person. When the occupant is vision impaired, the output, at block 606 can be via text to speech processing and audio is output through the at least one output device 54.

Figure 8:
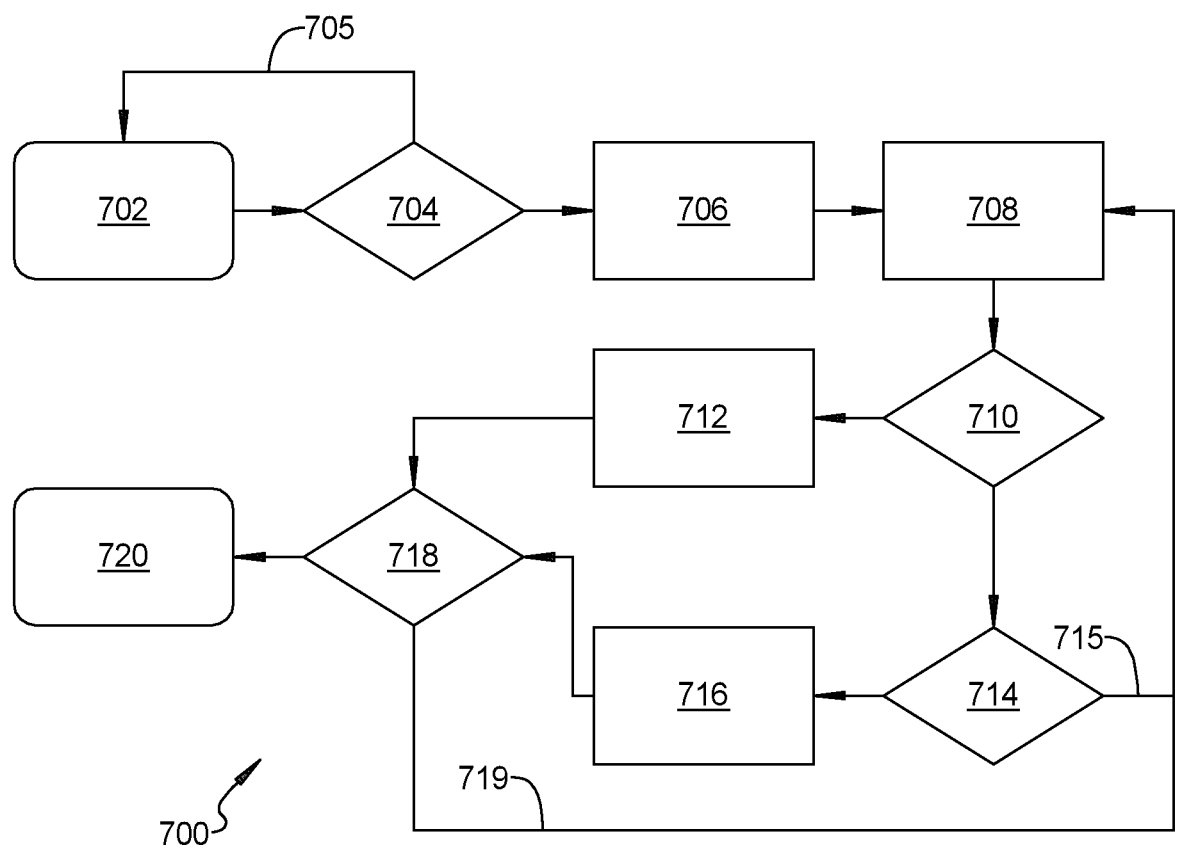
FIG. 8 is a flow chart illustrating a process of communicating with vision impaired occupants within a vehicle using an occupant output system according to an exemplary embodiment.

Referring to FIG. 8, a flow chart illustrating operation of the system and method of the present disclosure is shown at 700. Starting at block 702, the system 10 searches for a vision impaired passenger. At block 704, if the system 10 does not identify a vision impaired passenger, then the system starts over, and reverts back to block 702, as indicated by arrow 705. If the system 10 does identify a vision impaired passenger, then, moving to block 706, the system 10 determines the location of the vision impaired passenger within the vehicle, as well as the orientation of the head and eyes of the vision impaired passenger.

Moving to block 708, the system 10 monitors the interior environment 42 of the vehicle 12 and the external environment 38 surrounding the vehicle 12. Moving to block 710, if the system 10 detects salient activity or sound within or near the vehicle 12, then, moving to block 712, the system provides output to the vision impaired passenger describing the activity and/or sound. If the system 10 does not detect salient activity or sound at block 710, then moving to block 714, the system 10 checks to see if the head or eye location of the vision impaired passenger has changed and remained stationary for a pre-determined amount of time. If, at block 714, the head and/or eye location of the vision impaired passenger has not changed, or has not been stationary for the pre-determined time, then the system 10 reverts back to monitoring the interior environment 42 of the vehicle 12 and the external environment 38 surrounding the vehicle 12 at block 708, as indicated by arrow 715. If, at block 714, the head and/or eye location of the vision impaired passenger has changed, and has remained stationary for the pre-determined time, then, moving to block 716, the system 10 provides an output to the vision impaired passenger describing the scene within the vision impaired passengers field of view or gaze. After output messages have been provided at one or both of blocks 712 and 716, then moving to block 718, if the ride in the vehicle is complete, then, moving to block 720, the process of the system 10 ends. If, at block 718, the ride in the vehicle 12 is not complete, then, the process flow goes back to block 708, as indicated by arrow 719, wherein the system 10 continues to monitor the interior environment 42 of the vehicle 12 and the external environment 38 surrounding the vehicle 12, and providing appropriate messages in a periodic repeating cycle until the ride within the vehicle 12 is over.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system associated with a vehicle, comprising:
an occupant output system comprising at least one output device adapted to provide output directed to a single passenger within the vehicle;
an occupant monitoring system adapted to track location and movement of the passenger within the vehicle;
at least one processor in operable communication with the occupant output system and the occupant monitoring system, wherein the at least one processor is configured to execute program instructions, wherein the program instructions are configured to cause the at least one processor to:
receive data from the occupant monitoring system;
analyze the data from the occupant monitoring system to determine if the passenger is vision-impaired;
analyze the data from the occupant monitoring system to determine a location of the passenger within the vehicle and an orientation of a head of the passenger;
when the passenger is determined to be vision impaired,
generate an output for the passenger on the at least one output device, based on the location of the passenger within the vehicle and the orientation of the head of the passenger.

2. The system of claim 1, wherein analyzing the data from the occupant monitoring system includes using a machine learning algorithm.

3. The system of claim 1, wherein the program instructions are further configured to cause the at least one processor to output, via the at least one output device, a sound, and to monitor a response to the sound by the passenger to determine if the passenger is vision-impaired.

4. The system of claim 1, wherein analyzing the data from the occupant monitoring system includes tracking one or both eyes of the passenger.

5. The system of claim 4, further including a plurality of sensing devices adapted to collect image and perception data of an external environment relative to the vehicle and an internal environment of the vehicle, the program instructions further configured to cause the at least one processor to:
receive image and perception data from the plurality of sensing devices;
analyze the image and perception data from the plurality of sensing devices; and
generate an output for the passenger that describes physical objects and activity in a field of view of the passenger, based on the location of the passenger within the vehicle and the orientation of the head and eyes of the passenger.

6. The system of claim 4, wherein the at least one processor is in communication with a plurality of vehicle sensors, the program instructions further configured to cause the at least one processor to:
receive vehicle data from the plurality of vehicle sensors;
analyze the vehicle data from the plurality of vehicle sensors; and
generate an output for the passenger that describes physical objects and activity external to the vehicle and actions taken by the vehicle in response to unexpected driving maneuvers.

7. The system of claim 4, further including a plurality of sensing devices adapted to collect image and perception data of an external environment relative to the vehicle and an internal environment of the vehicle, and at least one microphone adapted to collect audio from the interior of the vehicle, the program instructions further configured to cause the at least one processor to:
receive image and perception data from the plurality of sensing devices, and audio data from the at least one microphone;
analyze the image, perception and audio data; and
generate an output for the passenger that describes physical objects and activity within the interior of the vehicle within context of detected conversations between other passengers within the vehicle.

8. The system of claim 1, wherein the at least one output device is an audio device adapted to provide audible output only to the passenger.

9. The system of claim 8, wherein the at least one output device is one of a directional speaker mounted within the vehicle adapted to provide audible output that is perceptible only by the passenger, and a personal audio device adapted to be worn by the passenger.

10. The system of claim 1, wherein generating the output for the passenger includes translating the output into a preferred language of the occupant.

11. A method of controlling an occupant output system adapted to provide output directed to a single passenger within the vehicle, comprising:
tracking a location and movement of a passenger within the vehicle with an occupant monitoring system;
receiving, with at least one processor in operable communication with the occupant monitoring system, data from the occupant monitoring system;
tracking, with the occupant monitoring system, one or both eyes of the passenger;
analyzing, with the at least one processor, the data from the occupant monitoring system to determine a location of the passenger within the vehicle and an orientation of a head and eyes of the passenger;
analyzing, with the at least one processor, the data from the occupant monitoring system to determine if the passenger is vision-impaired; and
when the passenger is determined to be vision impaired, generating, with the at least one processor, an output for the passenger on the at least one output device, based on the location of the passenger within the vehicle and the orientation of the head of the passenger.

12. The method of claim 11, wherein analyzing the data from the occupant monitoring system includes using a machine learning algorithm.

13. The method of claim 11, wherein the analyzing, with the at least one processor, the data from the occupant monitoring system to determine if the passenger is vision-impaired further includes, outputting, via the at least one output device, a sound, and monitoring a response to the sound by the passenger to determine if the passenger is vision-impaired.

14. The method of claim 11, further including:
receiving, with the at least one processor, image and perception data of an external environment relative to the vehicle and an internal environment of the vehicle from a plurality of sensing devices;
analyzing, with the at least one processor, the image and perception data from the plurality of sensing devices; and
generating, with the at least one processor, an output for the passenger, via the at least one output device, that describes physical objects and activity in a field of view of the passenger, based on the location of the passenger within the vehicle and the orientation of the head and eyes of the passenger.

15. The system of claim 11, further including:
receiving, with the at least one processor, vehicle data from a plurality of vehicle sensors;
analyzing, with the at least one processor, the vehicle data from the plurality of vehicle sensors; and
generating, with the at least one processor, an output for the passenger, via the at least one output device, that describes physical objects and activity external to the vehicle and actions taken by the vehicle in response to unexpected driving maneuvers.

16. The method of claim 11, further including:
receiving, with the at least one processor, image and perception data from a plurality of sensing devices;
receiving, with the at least one processor, audio data from at least one microphone;
analyzing, with the at least one processor, the image, perception and audio data; and
generating, with the at least one processor, an output for the passenger, via the at least one output device, that describes physical objects and activity within the interior of the vehicle within context of detected conversations between other passengers within the vehicle.

17. An occupant output system associated with a vehicle, comprising:
at least one audio output device adapted to provide output directed only to a single passenger within the vehicle, the at least one audio output device comprising one of a directional speaker mounted within the vehicle adapted to provide audible output that is perceptible only by the passenger, and a personal audio device adapted to be worn by the passenger;
an occupant monitoring system adapted to track location and movement of the passenger within the vehicle and track one or both eyes of the passenger;
at least one processor in operable communication with the occupant output system and the occupant monitoring system, wherein the at least one processor is configured to execute program instructions, wherein the program instructions are configured to cause the at least one processor to:
receive data from the occupant monitoring system;
analyze the data from the occupant monitoring system, output a sound, and monitor a response to the sound by the passenger to determine if the passenger is vision-impaired;
analyze the data from the occupant monitoring system to determine a location of the passenger within the vehicle and an orientation of a head and eyes of the passenger;
when the passenger is determined to be vision impaired,
generate an output for the passenger, translate the output into a preferred language of the occupant, and provide the output, on the at least one output device, to the passenger based on the location of the passenger within the vehicle and the orientation of the head of the passenger.

18. The system of claim 17, further including a plurality of sensing devices adapted to collect image and perception data of an external environment relative to the vehicle and an internal environment of the vehicle, the program instructions further configured to cause the at least one processor to:
receive image and perception data from the plurality of sensing devices;
analyze the image and perception data from the plurality of sensing devices; and
generate an output for the passenger that describes physical objects and activity in a field of view of the passenger, based on the location of the passenger within the vehicle and the orientation of the head and eyes of the passenger.

19. The system of claim 17, wherein the at least one processor is in communication with a plurality of vehicle sensors, the program instructions further configured to cause the at least one processor to:
receive vehicle data from the plurality of vehicle sensors;
analyze the vehicle data from the plurality of vehicle sensors; and
generate an output for the passenger that describes physical objects and activity external to the vehicle and actions taken by the vehicle in response to unexpected driving maneuvers.

20. The system of claim 17, further including a plurality of sensing devices adapted to collect image and perception data of an external environment relative to the vehicle and an internal environment of the vehicle, and at least one microphone adapted to collect audio from the interior of the vehicle, the program instructions further configured to cause the at least one processor to:
receive image and perception data from the plurality of sensing devices, and audio data from the at least one microphone;
analyze the image, perception and audio data; and
generate an output for the passenger that describes physical objects and activity within the interior of the vehicle within context of detected conversations between other passengers within the vehicle.

* * * * *